United States Patent [19]
Cole et al.

[11] Patent Number: 5,378,895
[45] Date of Patent: Jan. 3, 1995

[54] GAMMA NEUTRON ASSAY METHOD AND APPARATUS

[75] Inventors: Jerald D. Cole; Rahmat Aryaeinejad; Reginald C. Greenwood, all of Idaho Falls, Id.

[73] Assignee: EG&G Idaho, Inc., Idaho Falls, Id.

[21] Appl. No.: 149,874

[22] Filed: Nov. 12, 1993

[51] Int. Cl.⁶ .......................... G01T 1/172; G01T 3/00
[52] U.S. Cl. .......................... 250/390.04; 250/370.03; 376/257
[58] Field of Search ............. 250/390.04, 370.03; 376/257, 159, 158, 157, 154

[56] References Cited

U.S. PATENT DOCUMENTS

| | | | |
|---|---|---|---|
| 4,617,466 | 10/1986 | Menlove et al. | 250/390.04 |
| 4,620,100 | 10/1986 | Schoenig et al. | 250/358.1 |
| 4,724,118 | 2/1988 | Gremier | 376/159 |
| 4,897,221 | 1/1990 | Manchak, Jr. | 252/633 |
| 4,916,313 | 4/1990 | Hall et al. | 250/282 |
| 4,931,646 | 6/1990 | Koechner | 250/367 |
| 5,012,052 | 4/1991 | Hayes | 250/288 |
| 5,055,677 | 10/1991 | Amirav et al. | 250/282 |
| 5,068,534 | 11/1991 | Bradshaw et al. | 250/288 |
| 5,109,227 | 4/1992 | Godfrey | 340/600 |

OTHER PUBLICATIONS

Higgs, B. D., et al, "Unstaturated-Zone Vapor Port Installation in Groundwater Monitoring Wells at the Radioactive Waste Management Complex, Idaho National Engineering Laboratory," *Fourth National Technology Information Workshop, Remediation & Characterization II*, May 11-13, 1993.

Primary Examiner—Paul M. Dzierzynski
Assistant Examiner—Richard Hanig
Attorney, Agent, or Firm—Hopkins & Roden

[57] ABSTRACT

The gamma neutron assay technique is an alternative method to standard safeguards techniques for the identification and assaying of special nuclear materials in a field or laboratory environment, as a tool for dismantlement and destruction of nuclear weapons, and to determine the isotopic ratios for a blend-down program on uranium. It is capable of determining the isotopic ratios of fissionable material from the spontaneous or induced fission of a sample to within approximately 0.5%. This is based upon the prompt coincidence relationships that occur in the fission process and the proton conservation and quasi-conservation of nuclear mass (A) that exists between the two fission fragments. The system is used in both passive (without an external neutron source and active (with an external neutron source) mode. The apparatus consists of an array of neutron and gamma-ray detectors electronically connected to determine coincident events. The method can also be used to assay radioactive waste which contains fissile material, even in the presence of a high background radiation field.

14 Claims, 6 Drawing Sheets

GAMMA NEUTRON ASSAY METHOD AND APPARATUS

CONTRACTUAL ORIGIN OF THE INVENTION

The United States Government has rights in this invention pursuant to Contract No. DE-AC07-76ID01570 between the U.S. Department of Energy and EG&G Idaho, Inc.

FIELD OF THE INVENTION

The gamma neutron assay technique is a method and a system of using multiple gamma-ray and neutron detectors in a coincidence configuration in combination with nuclear electronics, a data acquisition system, and developed software to determine the type of fissile material and in a mixture of fissile materials their isotopic ratio via spontaneous or induced fission. The technique can also be used to assay fissile radioactive waste in a high gamma ray or neutron background environment when material with coincident radiation is present.

BACKGROUND OF THE INVENTION

Arms control treaties up to and including Strategic Arms Reduction Treaties (START) have used the approach of counting nuclear weapon delivery systems as the means of controlling the number of weapons. They have concentrated on deployed weapons and not stored weapons. With future efforts to be directed at actually counting the number of nuclear weapons and reducing the number of weapons, the long-term goal of arms control efforts becomes the same as one of the goals of the nuclear nonproliferation initiative: the reduction of current weapons stockpiles and special nuclear materials (SNM). This means that nuclear weapons must be disassembled and the SNM rendered useless for a weapon to be considered destroyed. This can be accomplished by either changing its shape and size (crushing, cutting) or fabricating it into a reactor fuel and burning it in a reactor.

Once the counting of nuclear weapons, as opposed to counting delivery vehicles or re-entry vehicles, for the purpose of dismantlement is begun, some method is necessary to determine that the item to be dismantled is a nuclear weapon. In addition, there must be some means to verify that the material in the item being examined before or after dismantlement, is SNM, what specific SNM is present, and that the SNM inside the weapon has been completely removed during disassembly. It is also necessary to know that all of this material is entered into the tracking system for accountability. This must be accomplished without weapons design information being revealed to anyone involved in this procedure.

The traditional safeguards techniques are far too intrusive to be used at this initial stage when the SNM is in a weapon configuration. This is true for a variety of reasons, but there is also the point that safeguards techniques often rely on well-calibrated equipment for specific configurations of SNM. This can present a difficulty for a field measurement. For example, when a weapon is removed from a missile, airplane, or storage bunker, the SNM is often surrounded by quantities of various materials that act as shielding or sources of additional radiation that are unknown to the verification inspector. Safeguards techniques would not give a correct analysis unless this configuration were known in detail. Such knowledge of the configuration would be considered restricted design information. These initial measurements would also have to be done in the field, when the weapon is first removed from the delivery system. This would be done possible in an extreme environment and, probably, after lengthy travel by the operating personnel and transportation of the equipment. Delicate equipment requiring precision calibration and stability for use might not work well in such a situation.

A field system has been developed to perform this scenario. It is called the Gamma Neutron Assay Technique (GNAT), and it uses neutron and high purity (HP) Ge gamma-ray detectors with coincidence requirements. Most importantly, it uses the physics of the fission process to specify what is required to be measured.

Such a system of multiple detectors operated in a prompt coincidence mode also has applications for identification of specific isotopes in a high gamma ray and/or neutron radiation field. It could be used to assay high-level fissile waste. The prompt coincidence mode can be described as declaring a nuclear fission event as having occurred if two or more pulses from two or more gamma-ray detectors, or two pulses from two or more neutron detectors, or one or more gamma rays and one or more neutron pulses occur within picoseconds ($10^{-12}$) of each other.

It is also possible to use a gamma-ray detector array without use of the neutron detectors for certain types of fissionable materials other than weapons.

SUMMARY OF THE INVENTION

When fission occurs, either induced or spontaneous, two fragments (fission products), from none to several neutrons, and several gamma rays are emitted, in prompt coincidence, i.e., time separation less than one picosecond. In some cases the fission may result in three fragments, but this is very rare and has been neglected for this work. The importance of this is that the two fragments contain all the protons in the initial nucleus. This is Z (where Z=atomic number or number of protons) conservation between the two fragments.

$$Z_f = Z_l + Z_h$$

where
- $Z_f$ = atomic number fissioning isotope
- $Z_h$ = atomic number heavy fragment
- $Z_l$ = atomic number light fragment This is not the case for the neutrons as the two fragments do not contain all the neutrons in the nucleus that fissioned, as several neutrons can be emitted. However, for neutrons, we still have a quasi-conservation of nuclear mass A since:

$$A_f = A_l + A_h + n$$

where
- $A_f$ = atomic mass of the fissioning isotope
- $A_l$ = atomic mass of the light fragment
- $A_h$ = atomic mass of the heavy fragment
- n = number of prompt (within one pico second) neutrons emitted The n will have values up to typically 7 neutrons with 2 to 4 being most probable. Thus, for example, if using our detector system we can fix on $A_h$, then by measuring the probability distribution of the emitted values of $A_l$, we can with some degree of certainty establish the value of $A_f$.

For the heavy fragment, independent of the fissioning isotope, the masses that are just above and close to the double closed shell at N=82 (wherein N=number of neutrons) and $Z_h$=50 comprise the largest fractional mass yield. The mass chains of A=132–136 (where A=N+Z) are in the 8% to 6% yield. The even-even isotopes of $^{132,134}$Sn and $^{134,136}$Te are not only of very high yield but have multiple transitions of 2–4 Mev each. These gamma rays are very penetrating and can be detected through the large quantities of high Z material present in a weapon. Since the neutrons and gamma rays are in prompt coincidence, observing these high-energy gamma rays from one fragment makes it possible to observe the gamma rays in the partner fragment. This coincidence relation allows the background gamma-ray counts that are generally associated with the fission process to be reduced relative to the relevant fissile gamma-ray and neutron counts. By seeing the gamma rays from both fragments, the element fissioning is uniquely identified using the principal of conservation of Z and the quasi-conservation of nuclear mass A.

The isotopic ratio of fissionable material can be determined in two different ways, with and without use of neutron detectors. In the first, if neutron detectors are used, this isotopic ratio can be determined from the comparison of the relative yields of light-mass fragments when no neutron is emitted, or from the relative yields of light-mass fragments with one neutron or more neutrons emitted. In the second option, when neutron detectors are not used, this isotopic ratio can be obtained from the presence of different light-mass fragments and their probability distribution. In the first case, by additionally requiring one or more neutrons to be in prompt coincidence with the pairs of coincident gamma rays, the signal-to-background gamma-ray ratio can be further improved.

rays, the fission partner is molybdenum. Molybdenum gamma rays are observed from $^{105}$Mo to $^{100}$Mo. The particular isotopes of molybdenum can be determined from neutron-gamma ray coincidence and a gamma ray and neutron selection and discrimination process. This is the process of selecting energy, time and particle requirements from the coincidence data.

The same type of analysis can be done for uranium. If $^{134}$Te is used again, the fission partners are in zirconium. Further analysis by gamma-ray energy discrimination to find which zirconium isotopes are present and their isotopic distribution will tell which uranium isotopes are present. The use of multiple coincidence relations causes the relative background to signal coupling ratios to be reduced to the point that these weak signals from the different fission fragments can be observed and used as signatures. It should be noted that the system does not require precision calibration; and, for a relative measurement, it is insensitive to environmental conditions. The problems of weak- or low-energy gamma rays in a high background field are not a problem with GNAT as we are looking at high-energy gamma rays and the coincidence requirement reduces the background.

The system would be useful for field measurements to identify SNM before disassembly of a nuclear weapon as the shielding surrounding the material would not affect the determination of isotopes present. High percentage mixtures of highly enriched uranium (HEU) and depleted uranium as would be the result of a blend-down program of nuclear fissionable material would not present a problem. The mixture of plutonium and uranium in either an oxide or metal mix would not be a problem, since, for example, the partner light-mass isotopes to $^{134}$Te are molybdenum and zirconium, respectively, and the dynamic range of GNAT appears to be about four orders of magnitude.

GNAT would also be useful in the area of identifica-

TABLE 1

| Fissioning Isotope | $Z_f$ | $T_{\frac{1}{2}}$ (SF) yr | Light-mass Fragment Associated with $^{134}$Te (=$Z_m$) | | | | | | $Z_l$ |
|---|---|---|---|---|---|---|---|---|---|
| | | | N = 0 | N = 1 | N = 2 | N = 3 | N = 4 | N = 5 | |
| $^{238}$U | 92 | 8.19 × 10$^{15}$ | $^{104}$Zr | $^{103}$Zr | $^{102}$Zr | $^{101}$Zr | $^{100}$Zr | $^{99}$Zr | 40 |
| $^{235}$U | 92 | 3.5 × 10$^{17}$ | $^{101}$Zr | $^{100}$Zr | $^{99}$Zr | $^{98}$Zr | $^{97}$Zr | $^{96}$Zr | 40 |
| $^{242}$Pu | 94 | 6.75 × 10$^{10}$ | $^{108}$Mo | $^{107}$Mo | $^{106}$Mo | $^{105}$Mo | $^{104}$Mo | $^{103}$Mo | 42 |
| $^{242}$Pu | 94 | 1.34 × 10$^{11}$ | $^{106}$Mo | $^{105}$Mo | $^{104}$Mo | $^{103}$Mo | $^{102}$Mo | $^{101}$Mo | 42 |
| $^{239}$Pu | 94 | 5.5 × 10$^{15}$ | $^{105}$Mo | $^{104}$Mo | $^{103}$Mo | $^{102}$Mo | $^{101}$Mo | $^{100}$Mo | 42 |
| $^{241}$Am | 95 | 1.15 × 10$^{14}$ | $^{107}$Tc | $^{106}$Tc | $^{105}$Tc | $^{104}$Tc | $^{103}$Tc | $^{102}$Tc | 43 |
| $^{252}$Cf | 98 | 2.64 | $^{118}$Pd | $^{117}$Pd | $^{116}$Pd | $^{115}$Pd | $^{114}$Pd | $^{113}$Pd | 46 |

Table 1 lists the light-mass fragment that is produced in partnership with the heavy-mass fragment $^{134}$Te for the fission isotopes listed in the first column. The spontaneous fission (SF) half life, in years, is included in the table as well as the specific light-mass fragment isotopes produced for the cases of zero to five emitted neutrons.

The identification of fissile material, either by spontaneous or induced fission, can be done in even adverse conditions. Induced fission can be provided by neutron irradiation. The coincidence requirement reduces the gamma-ray or neutron backgrounds relative to the signal of interest by several orders of magnitude; and, with the transitions in the isotopes of interest being now well established, identification of isotopic ratios of different fissile materials present in a sample can be determined.

Consider the example of $^{239}$Pu. $^{134}$Te is a good heavy-mass fission fragment to select in order to identify this isotope and it has several gamma rays above 2 Mev. If you observe what is in coincidence with these gamma tion of composition of high-level mixes of radioactive fissionable material in either waste or process streams. This is due to the large suppression of background radiation that occurs with the coincidence measurements. GNAT is very amenable to a computer analysis system as the coincidence data yields simpler signatures for identification of materials.

The apparatus and system can be generally described as comprising:
  a detector frame;
  an array of two or more neutron detectors mounted on the frame;
  an array of two or more gamma-ray detectors mounted on the frame;
  multiple electrical connections between the gamma-ray detectors, the neutron detectors, and an electronics system for transmitting power to said neutron and gamma-ray detectors and pulse signals from said neutron and gamma-ray detectors to the electronics system;

electronic means for amplifying and expanding said neutron and gamma-ray pulses;

electronic means for determining prompt coincidence by monitoring an overlap of any two or more of the expanded pulses, whether gamma-gamma pulses, gamma-neutron pulses, or neutron-neutron pulses, and only when said overlap equals or exceeds a predetermined time period are digital signals transmitted and processed by a computer having output to a record keeping system, wherein processing the record keeping system can determine the light-mass isotope associated with the heavy-mass isotope, thereby identifying the fissionable nuclear material.

The method using the above system and apparatus can generally be described as comprising:

exposing an array of neutron and gamma-ray detectors to radiation from the special nuclear material;

monitoring the radiation emitted from the material to determine if two or more neutron pulses, or two or more gamma-ray pulses, or one or more neutron pulses and one or more gamma-ray pulses occurring in close time proximity;

amplifying and digitizing any gamma-ray pulses that occur;

expanding and inputting any gamma-ray pulses that occur, to a coincidence and master gate unit, to an analog digital converter and to a timing and digital converter;

expanding and inputting any neutron pulses that occur to the coincidence and master gate unit, and a pair of coulomb digital converters;

monitoring for a specific time overlap of expanded gamma-ray or expanded neutron pulses in the coincidence and master gate unit;

outputting a master gate signal to the analog digital converter, the timing digital converters, the coulomb digital converters, and a majority and logic unit, when the specific time overlap equals or exceeds predetermined value, thereby inputting a multiplicity of digital signals to a computer for analysis and data recording; and then processing the data recording to determine the type of fissionable nuclear materials and a ratio of their masses.

Other objects, advantages, and capabilities of the present invention will become more apparent as the description proceeds.

DETAILED DESCRIPTION OF THE INVENTION

Figure 1:
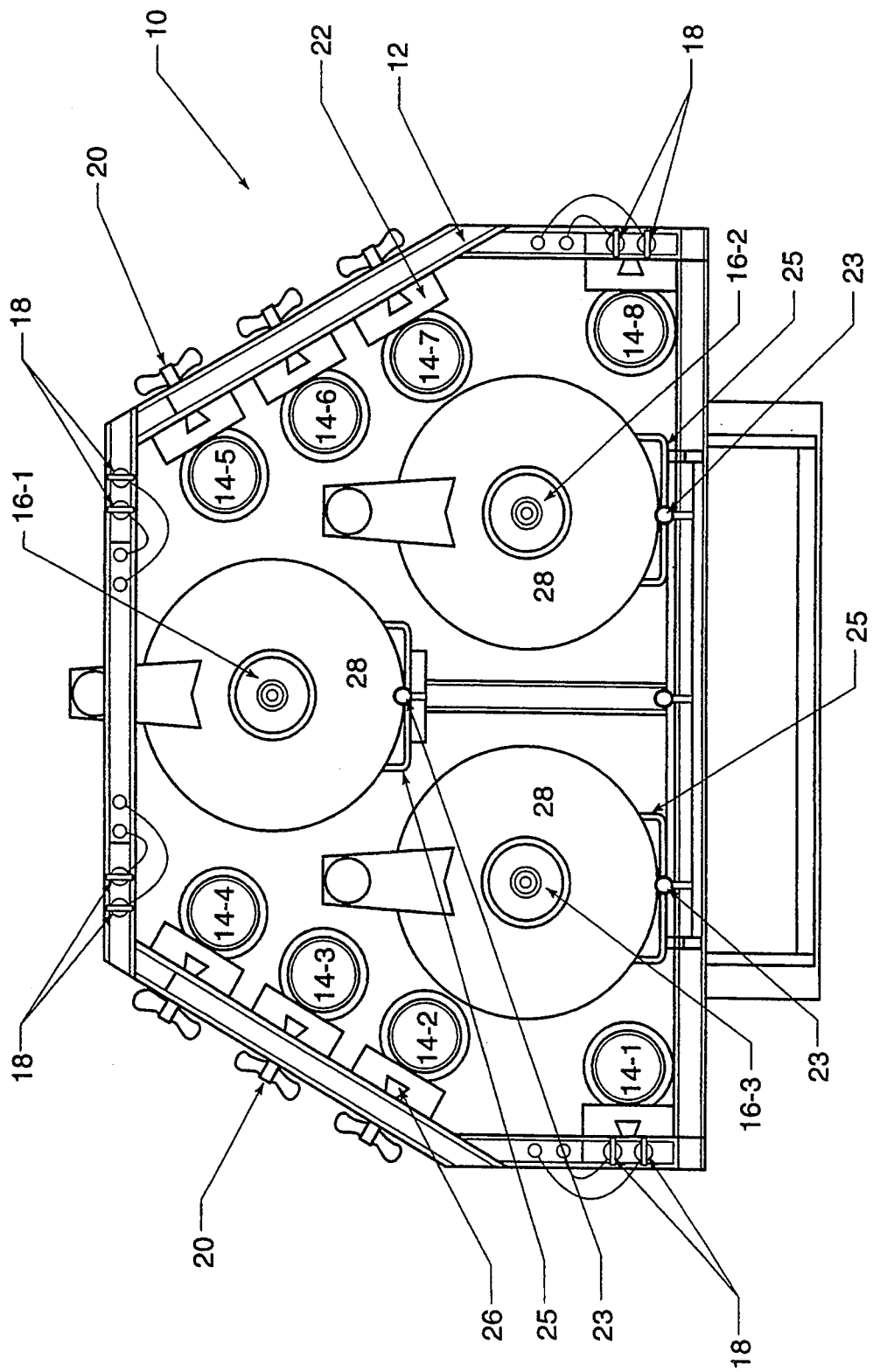
FIG. 1 is a front elevation of an array of neutron and gamma-ray detectors of the present invention.

The apparatus will be described by referring to FIGS. 1–3. The portable detector assembly 10 in FIG. 1 generally consists of a disconnectable aluminum frame 12 that supports an array of liquid scintillator neutron detectors 14, in this case eight, and three high purity germanium (HPGe) gamma-ray detectors 16.

Frame disassembly for transport is simplified by the push pins 18 that hold the separable sections together and the wing nuts 20 that connect the insulating blocks 22 to the frame 12. The location of the gamma-ray detectors can be horizontally adjusted by loosening the fasteners 23 and sliding the channel 25 forward or back. The push pins 18 have a small button that when pushed releases a detent on the opposite end of the pin, and it can be withdrawn from the engaging frame structure 12.

Figure 2:
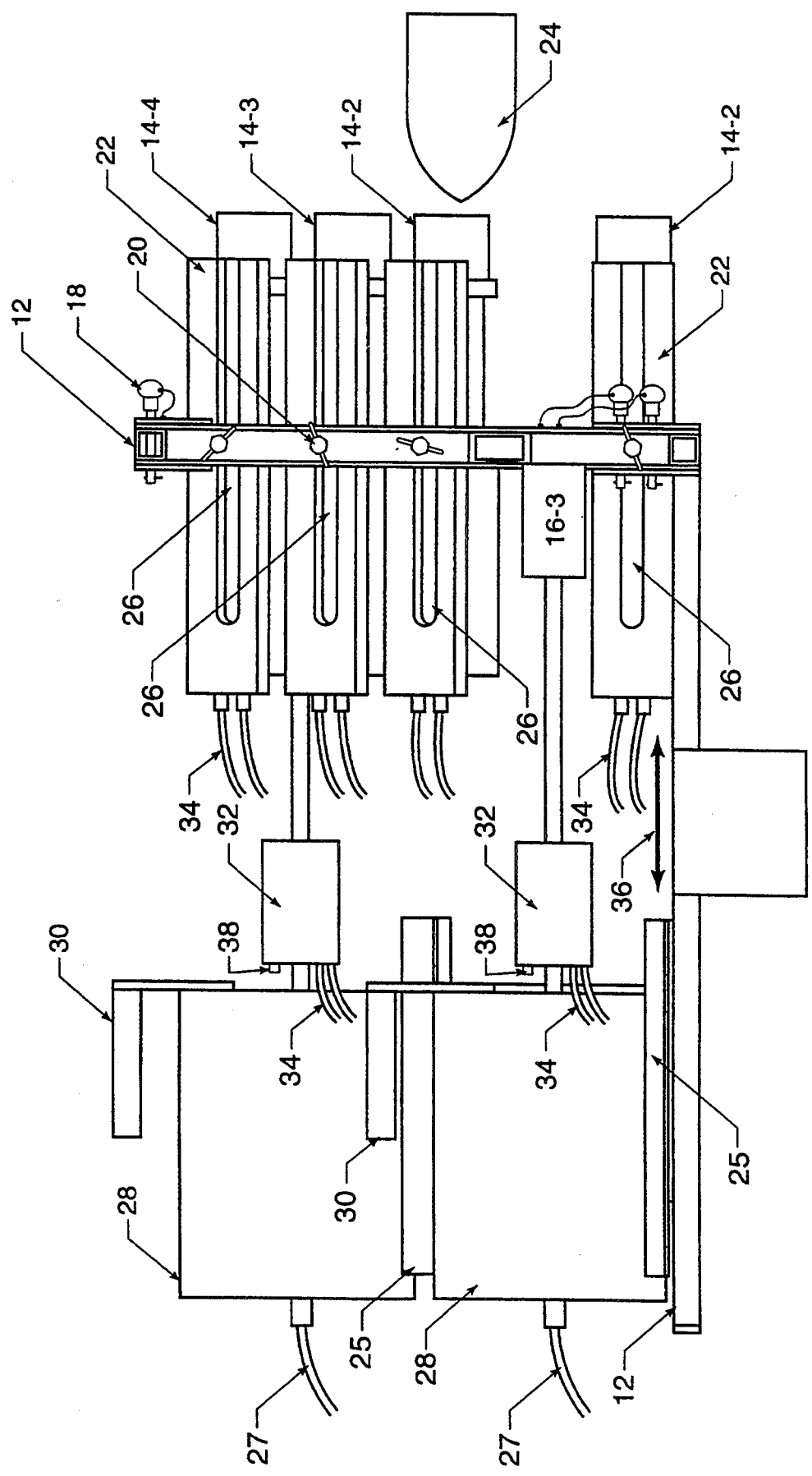
FIG. 2 is a side elevation of the array of detectors.
Figure 3:
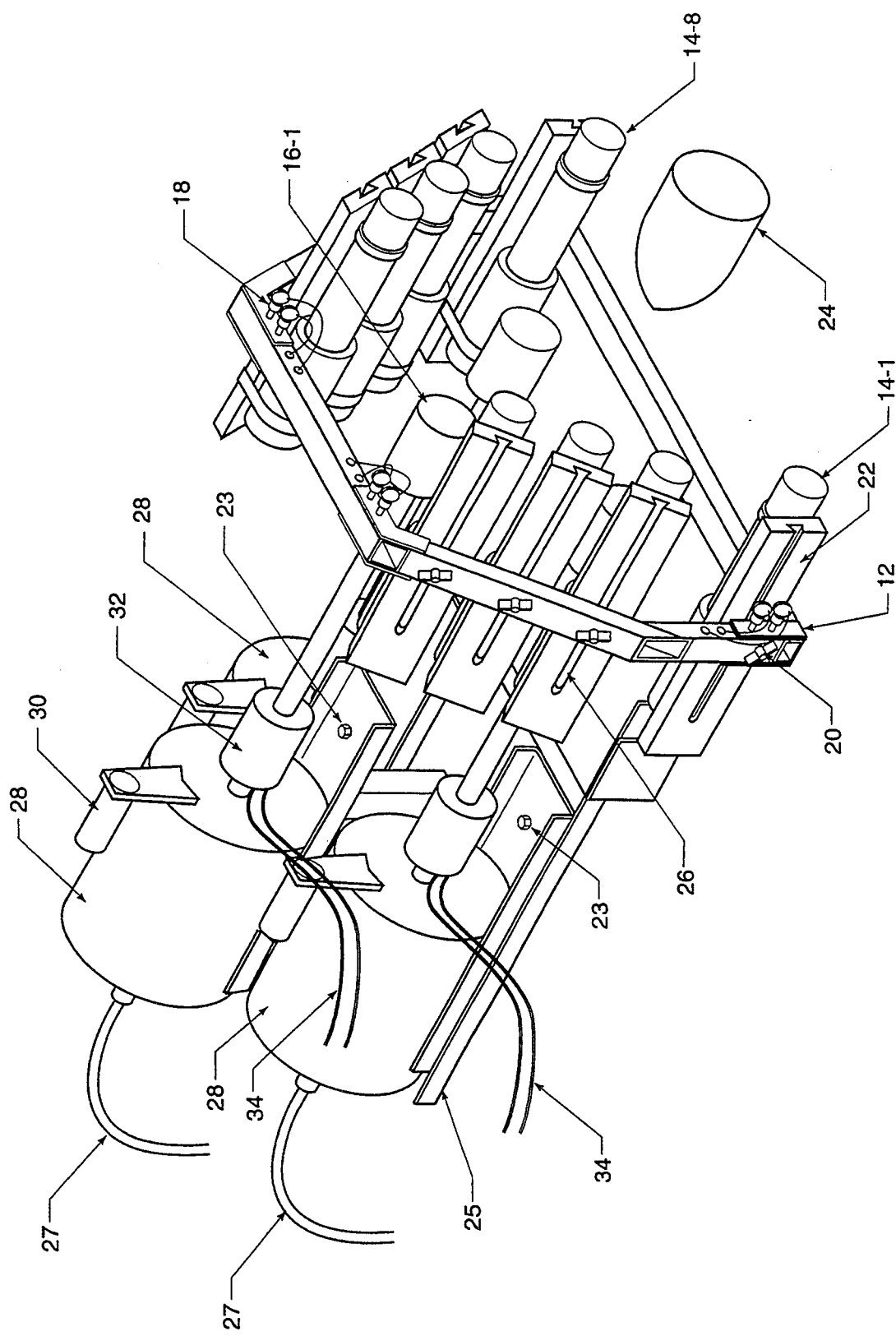
FIG. 3 is a side isometric view of the array of detectors.

Referring to FIGS. 2 and 3, the apparatus can be seen adjacent a typical armament 24 or other unknown fissile materials. The precise distance from each detector is known and is an input to a computer program that calculates the output. The horizontal adjustability of the neutron detectors 14 is accomplished by loosening wing nuts 20 and allowing the blocks 22 to slide forward or back, as needed, by means of captive slot 26.

In this view, the liquid nitrogen lines 27 that cool the gamma-ray detectors are shown entering reservoir 28 which has a handle 30 for portability. Some of the gamma-ray detector system electronics are illustrated as gamma-ray preamplifier 32 which connects to power supplies and signal amplifiers via cables 34.

Frame 12 can be mounted on an adjustable folding stand (not shown) adding to the portability of the whole assembly 10. Adjustment horizontally as at arrow 36 (FIG. 2) of the gamma-ray detectors 16 and neutron detectors 14 is dependent on the energies of the source 24. The preamplifiers 32 for gamma-ray detection have an LED 38 that lights red when gamma-ray flux is near the detector 16 limit.

The system monitors pulses, processes the pulses, analyzes the pulse wave forms and timing, and ultimately generates data and a spectra as shown typically in FIGS. 4A and 4B, as will be described later.

Figure 5:
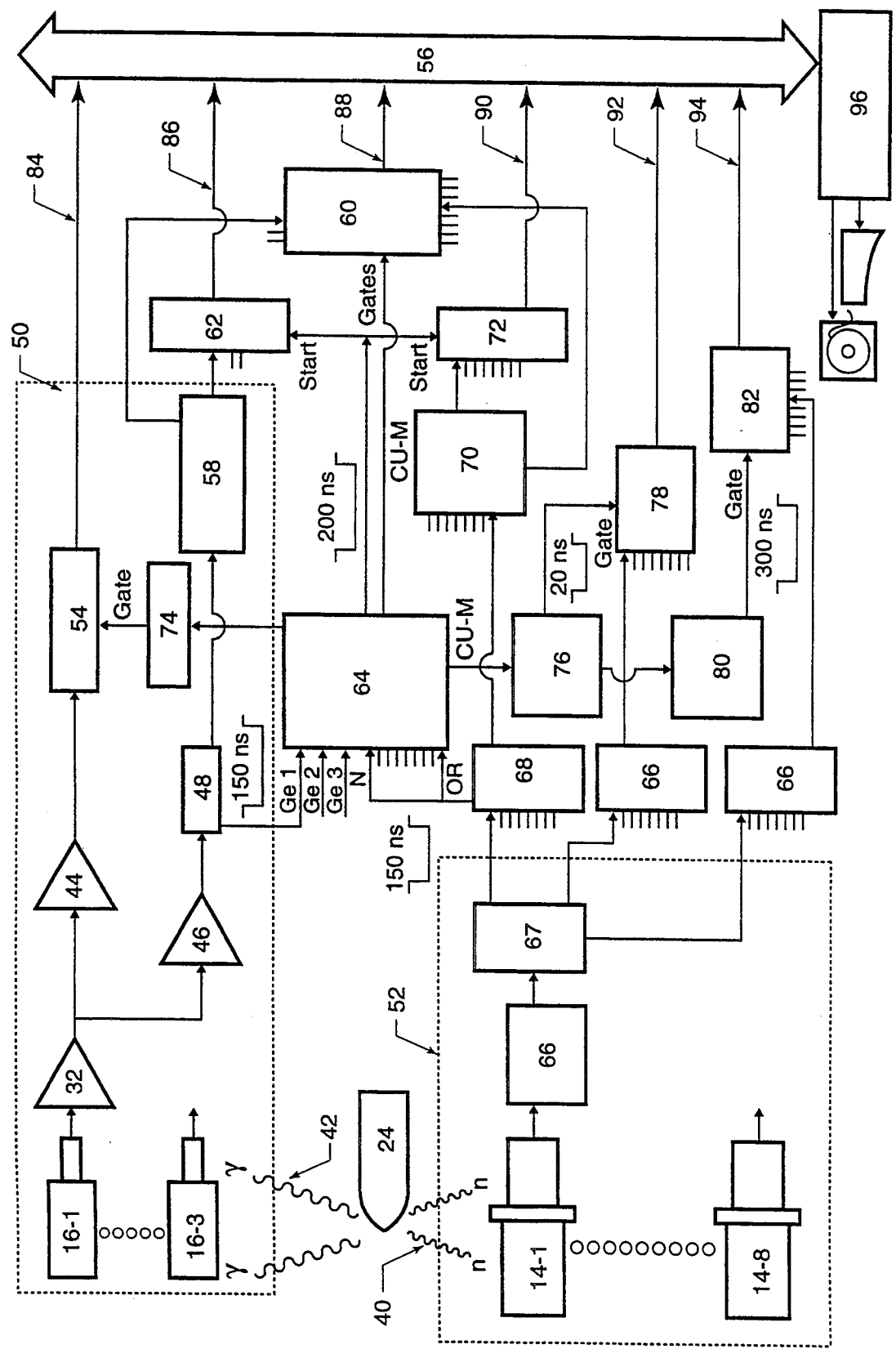
FIG. 5 is an electrical block diagram of the present invention.

The electronics and computer inputs will be described by referring to the schematic block diagram of FIG. 5. The unknown fissile material or armament 24, at the time of fission, radiates neutrons (n) 40 and gamma ($\gamma$) rays 42 which create a pulse in neutron detectors 14 or gamma-ray detectors 16 (only two of each is shown). The gamma-ray pulse passes through preamplifiers 32 to the amplifiers 44.

In addition to inputs to the amplifier 44, a parallel output from gamma-ray detector preamplifier 32 connects to a timing filter amplifier (TFA) 46 having an output to a gamma-ray constant fraction discriminator (CFD-$\gamma$) 48. It should be noted that all items within phantom box 50 are three in number for the three $\gamma$ detectors 16. Likewise, items within box 52 are eight in number for the eight neutron detectors 14.

The gamma-ray signal from amplifier 44 is converted to a digital signal in analog-to-digital converter (ADC) 54, which has a digital output to a computer automated measurement and control (CAMAC) bus 56.

It should be noted, in the description that follows, the time delay values given are those used in the experiment and would vary when using different input parameters, different components, or modified configurations.

The CFD-γ48 output 150 ns pulse goes through a 128-second gamma-ray time delay 58 to a majority and logic unit 60 and also to a gamma-ray timing digital converter (TDC-γ) 62. The CFD-γ48 also outputs a 150 ns pulse to a coincidence unit that generates a master gate (CU 64).

The neutron detectors 14-1 through 8 output a pulse through a 64 ns delay circuit 66 to a linear fan in/out (LFIO) 67 which in turn has outputs to: a neutron constant function discriminator (CFD-n); a first 100 ns delay means D-1; and a second 100 ns delay means D-2. The delay means used for these experiments utilized cable lengths, i.e., 0.65–0.085 ft/ns delay.

The outputs of the CFD-n 68 send a negative 150 ns pulse to the CU (and generates a master gate) 64 and also to a second 128 ns delay means 70 which in turn outputs to a neutron timing digital converter (TDC-n) 72 and the MALU 60.

During calibration, the CFD-n 68 and the CFD-γ48 pulses must arrive at less the 1 ns separation at the CU 64. During operation, the overlap between at least two signals must be five (5) ns or greater. This causes the master gate signal to be generated.

There are four −600 mv outputs (master gates) from the coincidence unit 64 when two or more input signals are coincident, i.e., either gamma rays, neutrons, or gamma-neutron combinations.

The first output is to a gate and delay circuit (G&D) 74 which in turn outputs a 200 ns gate signal to the ADC 54. The second and third output gate signal is a START signal to the TDC-γ64 and TDC-n 72 and the fourth is to a first logic unit LU-1 76.

In analyzing the n pulses, it should be noted that the neutron detectors 14, in addition to transmitting neutron pulses, also transmit γ pulses, accordingly there is need for discrimination between these two pulses. This is accomplished by having two logic units 76 and 80 and two coulomb digital converters 78 and 82 as will be explained later.

Figure 6:
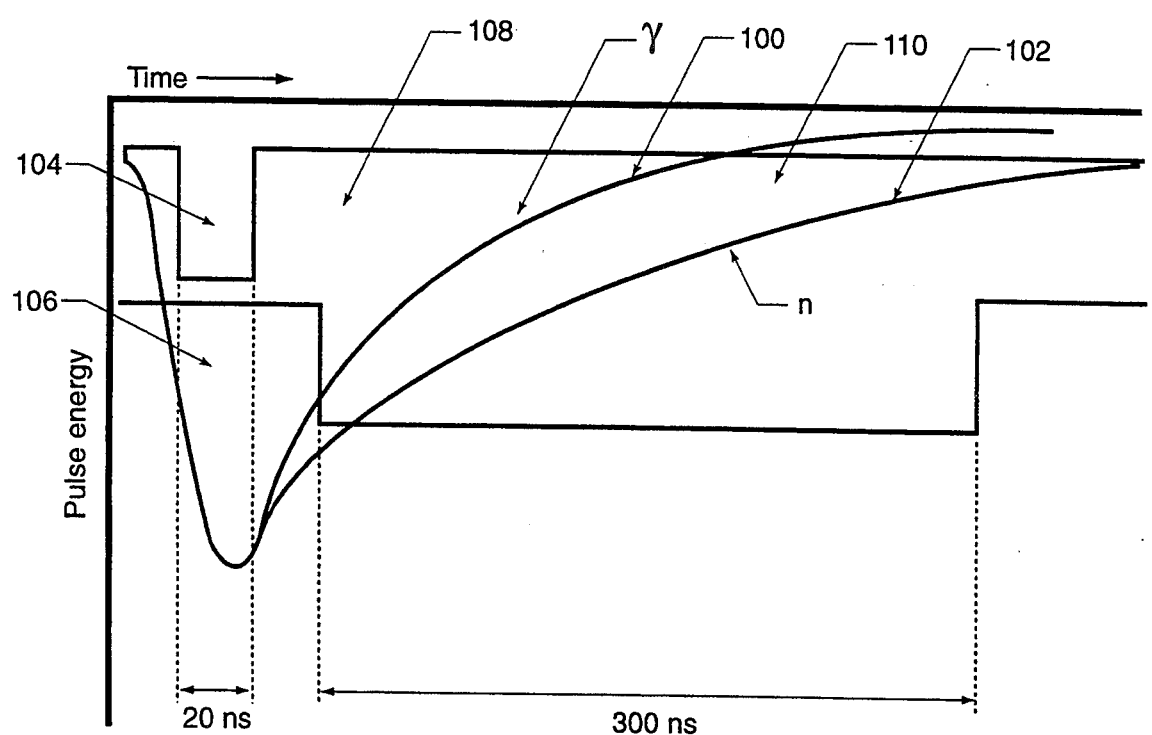
FIG. 6 is a plot of pulse energy versus time as an input to the coulomb digital converter QDC-2.

LU-1 outputs a 20 ns pulse gate (−600 mv) to a first coulomb digital converter (QDC-1) 78 and a second similar output pulse to a second logic unit (LU-2) 80. Referring to FIG. 6, LU-2 output adds an additional −600 mv pulse gate of 300 ns duration as input to a second coulomb digital counter (QDC-2) 82.

The digital outputs to the CAMAC bus 56 are: an ADC 54 signal transmitting γpulse energy data 84; a γtiming interval 86, i.e., the interval between the start of the gate pulse from CU 64 and the 150 ns gate from CFD-γ; a "number of detectors activated signal" 88; a neutron timing interval 90; and a first and second neutron signal for pulse energy 92 and 94.

Figure 4A:
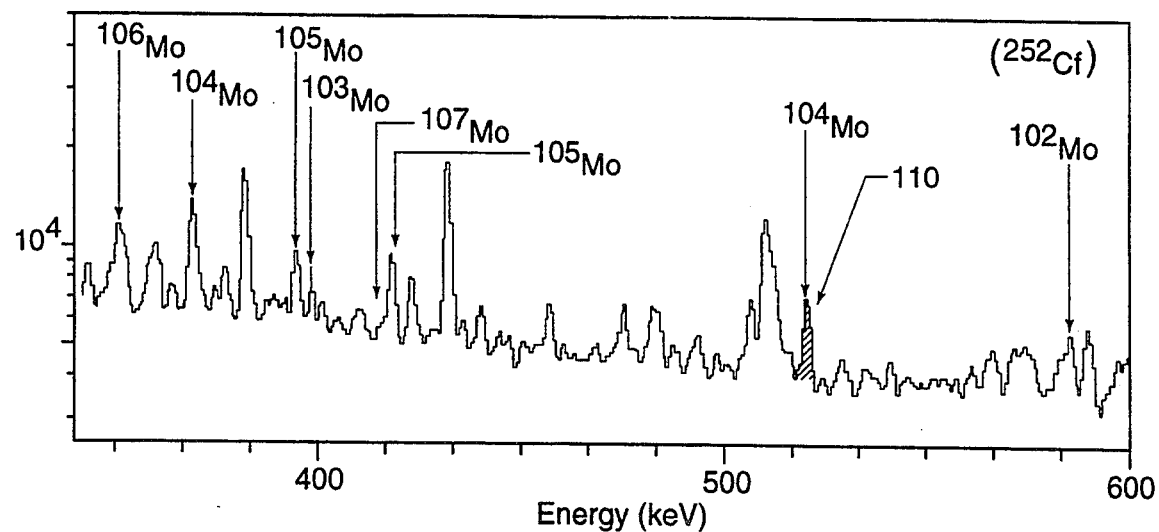
FIG. 4A is a spectra from the fission of $^{252}$Cf gamma ray discriminating on $^{114}$Ba lines.
Figure 4B:
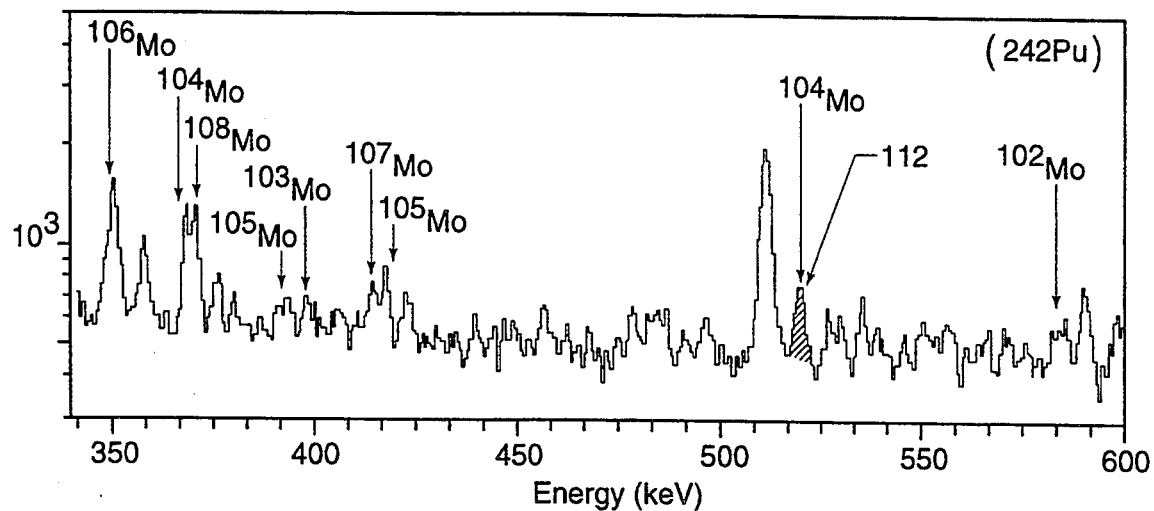
FIG. 4B is a spectra from the fission of $^{242}$Pu gamma ray discriminating on $^{134}$Te lines.

These outputs to the CAMAC bus 56 input to the computer and software 96 and are processed to provide output data to a tape 98 which can be further processed, for instance, to prepare the spectra of FIGS. 4A and 4B.

Referring to FIG. 6, the difference between a gamma-ray pulse 100 and a neutron pulse 102 can be detected by integrating the area under the curve 104 during the 20 second pulse gate 106 and the areas under the 300 ns gamma-ray pulse decay "tail" 108 and the 300 ns neutron pulse decay "tail" 110. Because of the significant energy difference in the decay portions, the computer software 96 can discern the difference by comparing the ratios of the "tail" energies to the 20 ns pulse areas.

The operation will be described by referring to FIG. 5. Assuming there is a possible coincident event between one gamma-ray detector 16 and one neutron detector 14, the gamma-ray pulse is transmitted through the preamplifier 32 and amplifier 44 to ADC 54. The pulse also is transmitted from the preamplifier 32 through the TFA 46 and CFD-γ 48 to both the 128 ns delay 58 and the coincidence unit (CU) 64 as a 150 ns gate.

Simultaneously, the neutron pulse passes through the delay 66 and the fan in/out 67 through the CFD-n 68 to the coincidence unit as a 150 ns gate. If the CFD-γ 48 gamma-ray pulse 150 ns gate overlaps the CFD-n neutron pulse gate by five (5) ns or more, coincidence is established and a 200 ns gate signal is transmitted to the G&D 74, the TDC's 62 and 72, and the LU-1 76. Once the coincidence has been established, the next significant events occurring are the ADC and QDC are turned on and the analog or energy pulses are digitized and transmitted to the computer 96.

Referring now to FIG. 4A, the spectra for molybdenum isotopes while "gated" or selectively discriminated by 144 barium, it is possible to determine the fissioning californium isotope by the molybdenum isotope present.

Referring to FIG. 4B (and Table 1), the spectra for the $_{42}$Mo isotopes is shown made by gating on $^{134}$Telumium, and includes the $^{107}$Mo and $^{108}$Mo isotopes, which referring to Table 1 identifies the fissioning element as plutonium since only the Pu has the molybdenum isotope.

The determination of the ratios of mixed fissioning isotopes can be determined by determining the ratios of the particular fragment isotopes. As previously stated, the system and method in certain cases can also be used to determine fissionable materials without the use of neutron detectors. The components could be similar to FIG. 5 using only those in the upper portion 112, eliminating the neutron components in the lower portion 114.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A gamma-ray and neutron assay system for determining a type of one or a mixture of fissionable nuclear materials, wherein pairs of fission products from this nuclear material consist of a heavy-mass isotope and a lighter mass isotope, said pairs exhibiting a conservation of protons between the two fission product isotopes and said nuclear materials emitting gamma rays and neutrons in prompt coincidence, the system comprising:

a. detector frame;
   b. an array of two or more neutron detectors mounted on the frame;
   c. an array of two or more gamma-ray detectors mounted on the frame;
   d. multiple electrical connections between the gamma-ray detectors, the neutron detectors, and an electronics system for transmitting power to said neutron and gamma-ray detectors and pulse signals from said neutron and gamma-ray detectors to the electronics system;
   e. electronic means for amplifying and expanding said neutron and gamma-ray pulses;

f. electronic means for determining prompt coincidence by monitoring an overlap of any two or more of the expanded pulses, whether gamma-gamma pulses, gamma-neutron pulses, or neutron-neutron pulses, and only when said overlap equals or exceeds a predetermined time period are digital signals transmitted and processed by a computer having output to a record keeping system, wherein processing the record keeping system can determine the light mass isotope associated with the heavy-mass isotope, thereby identifying the fissionable nuclear material.

2. The system as recited in claim 1 wherein the means for determining coincidence is a coincidence unit calibrated to output a coincidence signal only when gamma-ray or neutron pulse signals arrive at less than one nanosecond separation.

3. The system as recited in claim 1 wherein an overlap of any two or more expanded pulses must be about five nanoseconds or greater.

4. The system as recited in claim 1 wherein the detector assembly, the neutron detectors, and the gamma-ray detectors are adjustable and can be dismantled for portability.

5. A gamma-ray assay system for determining a type of one or a mixture of fissionable nuclear materials, wherein pairs of fission products from this nuclear material consist of a heavy-mass isotope and a lighter mass isotope, said pairs exhibiting a conservation of protons between the two fission product isotopes and said nuclear materials emitting gamma rays and neutrons in prompt coincidence. The system comprising:

a. a detector assembly;

b. an array of two or more gamma-ray detectors;

c. multiple electrical connections between the gamma-ray detectors and an electronics system for transmitting power to said gamma-ray detectors and pulse signals from said gamma-ray detectors to the electronics system;

d. electronic means for amplifying and expanding said gamma-ray pulses;

e. electronic means for determining prompt coincidence by monitoring an overlap of any two or more of the expanded pulses and only when said overlap equals or exceeds a predetermined time period are digital signals transmitted and processed by a computer having output to a record keeping system, wherein processing the record keeping system can determine the light mass isotope associated with the heavy-mass isotope, thereby identifying the fissionable nuclear material.

6. The system as recited in claim 5 wherein the means for determining coincidence is a coincidence unit calibrated to output a coincidence signal only when gamma-ray pulse signals arrive at less than one nanosecond separation.

7. The system as recited in claim 5 wherein the overlap of any two or more expanded pulses must be about five nanoseconds or greater.

8. The system as recited in claim 5 wherein the detector assembly and the gamma-ray detectors are adjustable and can be dismantled for portability.

9. A method for determining a type of one or a mixture of fissionable nuclear materials, wherein pairs of fission products from this nuclear material consist of a heavy-mass isotope and a lighter mass isotope, said pairs exhibiting a conservation of protons between the two fission product isotopes and said nuclear materials emitting gamma rays and neutrons in prompt coincidence, the method comprising:

a. exposing an array of neutron and gamma-ray detectors to radiation from the fissionable nuclear material;

b. monitoring the radiation emitted from the material to determine if two or more neutron pulses, or two or more gamma-ray pulses, or one or more neutron pulses and one or more gamma-ray pulses occurring in close time proximity;

c. amplifying and digitizing any gamma-ray pulses that occur;

d. expanding and inputting any gamma-ray pulses that occur to a coincidence and master gate units to an analog digital converter, and to a timing and digital converter;

e. expanding and inputting any neutron pulses that occur to the coincidence and master gate unit, and a pair of coulomb digital converters;

f. monitoring for a specific time overlap of expanded gamma-ray or expanded neutron pulses in the coincidence and master gate unit;

g. outputting a master gate signal to the analog digital converter, the timing digital converters, the coulomb digital converts, and a majority and logic unit, when the specific time overlap equals or exceeds a predetermined value, thereby inputting a multiplicity of digital signals to a computer for analysis and data recording; and then h. processing the data recording to determine the type of fissionable nuclear materials and a ratio of their masses.

10. The method of claim 9 further comprising the step of inducing the radiation from the fissionable nuclear material by directing neutrons from a neutron generating source toward the fissionable nuclear material.

11. The method of claim 9 wherein the specific time overlap of expanded gamma-ray or expanded neutron pulses is five nanoseconds or greater.

12. A method for determining a type of one or a mixture of fissionable nuclear materials, wherein pairs of fission products from this nuclear material consist of a heavy-mass isotope and a lighter mass isotope, said pairs exhibiting a conservation of protons between the two fission product isotopes and said nuclear materials emitting gamma rays and neutrons in prompt coincidence, the method comprising:

a. exposing an array of gamma-ray detectors to radiation from the fissionable nuclear material;

b. monitoring the radiation emitted from the material to determine if two or more pulses occurring in close time proximity;

c. amplifying and digitizing any pulses that occur;

d. expanding and inputting any pulses that occur to a coincidence and master gate units to an analog digital converter, and to a timing and digital converter;

e. monitoring for a specific time overlap of expanded pulses in the coincidence and master gate unit;

f. outputting a master gate signal to the analog digital converter, the timing digital converters, the coulomb digital converts, and a majority and logic unit, when the specific time overlap equals or exceeds a predetermined value, thereby inputting a multiplicity of digital signals to a computer for analysis and data recording; and then g. processing the data recording to determine the type of fissionable nuclear materials and a ratio of their masses.

13. The method of claim 12 further comprising the step of inducing the radiation from the fissionable nuclear material by directing neutrons from a neutron generating source toward the fissionable nuclear material.

14. The method of claim 12 wherein the specific time overlap of expanded gamma-ray or expanded neutron pulses is five nanoseconds or greater.

* * * * *